(12) United States Patent
Castanha et al.

(10) Patent No.: US 7,873,761 B2
(45) Date of Patent: Jan. 18, 2011

(54) DATA PIPELINE MANAGEMENT SYSTEM AND METHOD FOR USING THE SYSTEM

(75) Inventors: Ricardo Castanha, Nijmegen (NL); Franciscus Maria Vermunt, Waalre (NL); Tom Vos, Geldrop (NL)

(73) Assignee: NXP B.V., Eindhoven (NL)

( * ) Notice: Subject to any disclaimer, the term of this patent is extended or adjusted under 35 U.S.C. 154(b) by 437 days.

(21) Appl. No.: 11/915,822

(22) PCT Filed: May 22, 2006

(86) PCT No.: PCT/IB2006/051619

§ 371 (c)(1), (2), (4) Date: Nov. 28, 2007

(87) PCT Pub. No.: WO2006/129226

PCT Pub. Date: Dec. 7, 2006

(65) Prior Publication Data

US 2009/0282181 A1    Nov. 12, 2009

(30) Foreign Application Priority Data

May 30, 2005   (EP) ................................ 05104626

(51) Int. Cl.
*G06F 3/00* (2006.01)
(52) U.S. Cl. .................. 710/52; 710/56; 710/310
(58) Field of Classification Search .................. 710/52, 710/54, 56, 57, 110, 310
See application file for complete search history.

(56) References Cited

U.S. PATENT DOCUMENTS 5,325,492 A    6/1994 Bonevento et al.
5,584,038 A    12/1996 Papworth et al.
5,867,734 A *  2/1999 Drews ......................... 710/52
5,873,089 A *  2/1999 Regache .......................... 1/1

(Continued)

OTHER PUBLICATIONS

LIN (Local Interconnect Network),<http://www.interfacebus.com/Design_Connector_LIN_Bus.html>, accessed on Mar. 30, 2010.*

(Continued)

*Primary Examiner*—Khanh Dang

(57) ABSTRACT

The present invention relates to a data pipeline management system and more particularly to a minimum memory solution for unidirectional data pipeline management in a situation where both the Producer and Consumer need asynchronous access to the pipeline, data is non-atomic, and only the last complete (and validated) received message is relevant and once a data read from/write to the pipeline is initiated, that data must be completely processed. The data pipeline management system according to the invention can be implemented as a circular queue of as little as three entries and an additional handshake mechanism, implemented as a set of indices that can fit in a minimum of six bits (2×2+2×1). Both the Producer and Consumer will have a 2 bit index indicating where they are in the queue, and a 1 bit binary value indicating a special situation. Both parties can read all the indices but can only write their own, i.e. P and wrapP for the Producer and C and wrapC for the Consumer. For management of the handshakes a set of rules is provided.

16 Claims, 7 Drawing Sheets

U.S. PATENT DOCUMENTS

| | | | | |
|---|---|---|---|---|
| 6,212,543 | B1 * | 4/2001 | Futral | 718/102 |
| 6,978,457 | B1 * | 12/2005 | Johl et al. | 718/100 |
| 7,376,768 | B1 * | 5/2008 | Macciocca | 710/56 |
| 2004/0081094 | A1 * | 4/2004 | Melvin et al. | 370/230 |
| 2004/0240482 | A1 | 12/2004 | Huang | |
| 2008/0077763 | A1 * | 3/2008 | Steinmetz et al. | 711/170 |

OTHER PUBLICATIONS

CAN (Controller Area Network) <http://www.interfacebus.com/Design_Connector_CAN.html>, accessed on Mar. 30, 2010.*

Flexray Protocol, Freescale Semiconductor, Inc. 2005.*

* cited by examiner

FIG. 2

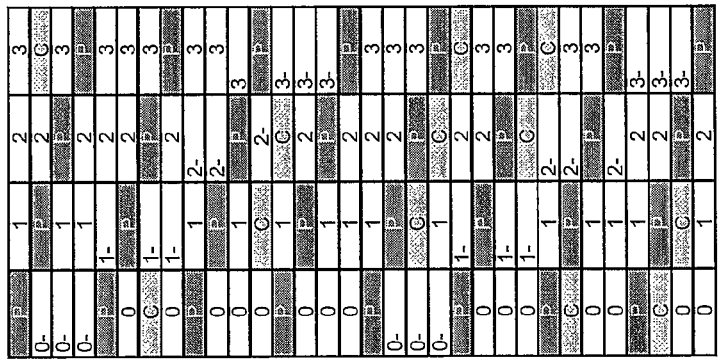
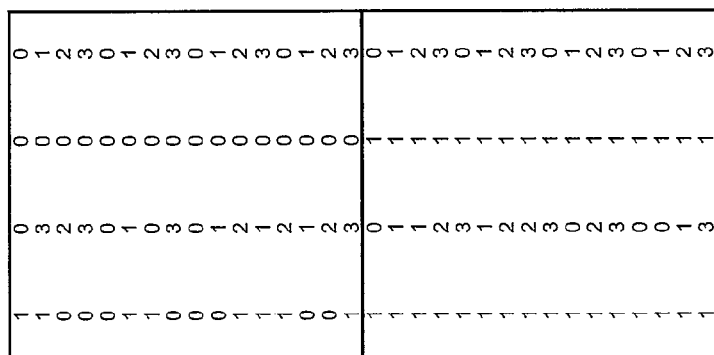
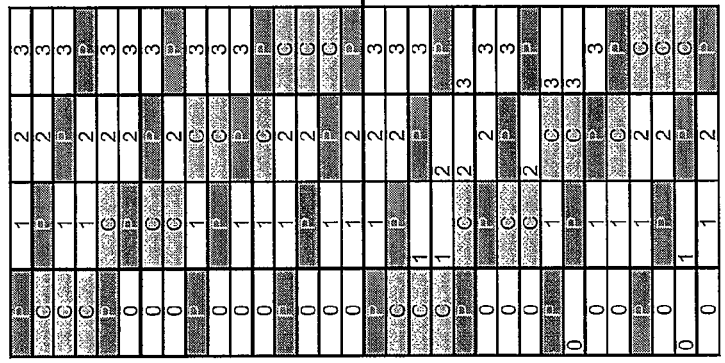
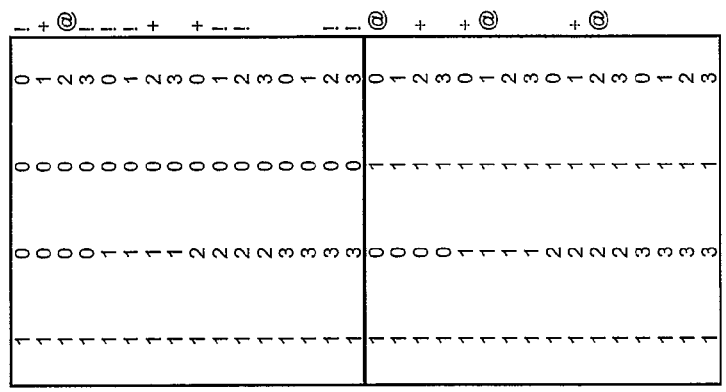
FIG. 4-1
FIG. 4-2

DATA PIPELINE MANAGEMENT SYSTEM AND METHOD FOR USING THE SYSTEM

The present invention relates to a data pipeline management system and more particularly to a minimum memory solution for unidirectional data pipeline management in a situation where both the Producer and Consumer need asynchronous access to the pipeline, data is non-atomic, only the last complete (and validated) received message is relevant and once a data read from/write to the pipeline is initiated, that data must be completely processed.

In a typical computer system comprising a host processor and a number of subsystems data transfer to and from the subsystems is necessary. It is known that in a networking application data transfer between subsystems is often the bottleneck. Due to other competing subsystems or processor tasks the processor and the subsystem are not able to form a synchronous connection on the interface bus.

U.S. Pat. No. 5,325,492 discloses a distributed pipe at the bus interface allowing the processor to asynchronously send and receive parameters to specify an operation. Memory in the processor and in the subsystems are used by the system as a shared memory which is configured as a distributed First In First Out (FIFO) circular queue. The communication is accomplished by placing additional self-describing control elements on the pipe which represent requests, replies and status information. In a FIFO environment the older entries will still be read as they become that latest entry available and therefore require high queue depths and large memory requirements.

The context of the present invention is a networking application, in which a protocol handler is integrated with a microcontroller. The microcontroller programs the protocol handler with the network configuration and sets up a pipeline through which data will be passed onto/received from the protocol handler. The data accesses to the pipeline by the reader and the writer are asynchronous to each other. Since the network configuration may have to be adapted on the fly, the configuration data and the data pipeline are placed in a shared memory rather than in the protocol handler itself. This overcomes limitations in the sizes of the data that needs to be shared.

Both the microcontroller and the protocol handler have exclusive access to the shared memory area for atomic accesses. Atomic means for this micro-controller a 32 bit access However, between two atomic accesses, the other party may interrupt with accesses of its own. Both the network configuration and the data in the pipeline are (potentially) non-atomic.

Data pipelines in either direction can exist, but each data pipeline will either only be read by the microcontroller and written by the protocol handler, or only be read by the protocol handler and written by the microcontroller. For each pipeline, there is then only one Producer and one Consumer.

The protocol demands that only after a message is complete and—if it comes from the protocol handler—validated may this be read and only the last complete message is relevant. All other messages that have been received completely but not yet read are not meaningful. This is in sharp contrast to standard queuing mechanisms such as a FILO (First In Last Out). This last message must then be exclusively made available for the Consumer and not be overwritten by any new incoming message at the Producer. In the opposite situation, an incoming message that has not yet been fully received (and validated) may not start being read.

A solution to the problem is to dimension the pipeline as a queue which depth is determined according to the rate of incoming and outgoing data. This is, however, not deterministic and if the reading and writing rates are very different may lead to immense queue depths, resulting in very large memory requirements or very large CPU loads.

It is an object of the present invention to provide a data pipeline management system and a method for using the system which uses only a small amount of memory in conjunction with a handshake mechanism.

According to an aspect of the present invention for achieving the above objects a data pipeline management system is provided, comprising a Producer and Consumer, and a unidirectional pipeline for data transfer, wherein all entries in the pipeline are accessible by the Producer and Consumer, only the last entry is valid, and read and write actions to the pipeline are asynchronous, characterized in that said pipeline is implemented as a circular queue of at least three entries, and a handshake mechanism is provided as a set of indices fitting into a minimum of six bits. Said set of indices comprises 2-bit indices for both the Producer and Consumer, respectively, indicating their position in said queue, and 1-bit binary values for both the Producer and Consumer, respectively, indicating a special situation. Said queue is preferably shared-memory and said data can be non-atomic.

In a preferred embodiment the pipeline is implemented as a circular queue of three entries. An advantage of this embodiment is that the memory requirement is reduced to a minimum.

Preferably said Producer is a microcontroller and said Consumer is a subsystem, or vice versa.

In one preferred embodiment the Producer is a microcontroller and said Consumer is a Flexray Data Link Controller, or vice versa.

In another preferred embodiment said Producer is a microcontroller and said Consumer is a Local Interconnect Network Controller, or vice versa.

In another preferred embodiment said Producer is a microcontroller and said Consumer is a Controller Area Network Controller.

It is an advantage of the above mentioned preferred embodiments that the data pipeline management system according to the invention can be used in automotive applications, in which an effective data pipeline management system due to an ever increasing load is important.

Accordingly, a method for using a data pipeline management system, comprising a Producer and Consumer, and a unidirectional pipeline for data transfer, wherein all entries in the pipeline are accessible by the Producer and Consumer, only the last entry is valid, and read and write actions to the pipeline are asynchronous, is provided, characterized in that the method comprises the step of providing a circular queue of at least three entries;
  providing a handshake mechanism as a set of indices fitting into a minimum of six bits comprising associating a 2-bit index with said Producer and with said Consumer, respectively, indicating the respective position in the queue, and associating a 1-bit binary value with said Producer and with said Consumer, respectively, indicating a special situation;
  marking a queue entry as belonging to the Producer by setting its 2-bit index to the corresponding value and blocking the Consumer from being able to read from that entry;
  marking a queue entry as belonging to the Consumer by setting its 2-bit index to the corresponding value and blocking the Producer from being able to write to that entry; and accessing the queue, wherein the Producer uses a write first-update later mechanism and the Consumer uses a update indices first-read later mechanism.

In an embodiment, a computer readable medium has instructions that when executed by a computer device causes the computer device to perform the steps of the above-described method.

The method according to the invention ensure advantageously that a minimum memory solution for effective data pipeline management can be used while preventing the loss of data.

Advantageously, said Producer is only allowed to change its set of indices, a 2-bit index P and a 1-bit binary value wrapP, and its accessing the queue follows the steps:

if the Consumers 2-bit index C is equal to the Producers 2-bit index P+1, i.e. C=P+1, the Producer writes to the queue entry associated with its 2-bit index P, and its 2-bit index P is set to P+2, its one bit binary value wrapP is set to the negation of the 1-bit binary value of the Consumer wrapC, i.e. wrapP=!wrapC;

if C!=P+1, write P, and set the next index values to P=P+1, wrapP=wrapC.

Said Consumer is also only allowed to change its set of indices, the 2-bit index C and the 1-bit binary value wrapC, and its accessing the queue follows the steps:

if C==P and wrapP==wrapC no update and no read is performed;

if C==P−1 and wrapP==wrapC then setting the newest data indices values to C=C, wrapC=wrapC and performing a read C followed by a post read-update comprising if wrapC wrapP then setting the newest data indices values to C=C+1 else C=C, wrapC=wrapC;

if C !=P−1 and wrapP==wrapC then setting the newest data indices values to C=P−1, wrapC=wrapC and performing a read C; and if C !=P−1 and wrapP !=wrapC then setting the newest data indices values to C=P, wrapC=wrapP and performing no read.

Advantageously the Producer takes precedence if the queue becomes empty.

The foregoing and other objects, features, and advantages of the invention will be apparent from the following more particular description of preferred embodiments of the invention, as illustrated in the accompanying drawings.

The present invention will now be described by way of example with reference to the accompanying drawings, in which.

Figure 1:
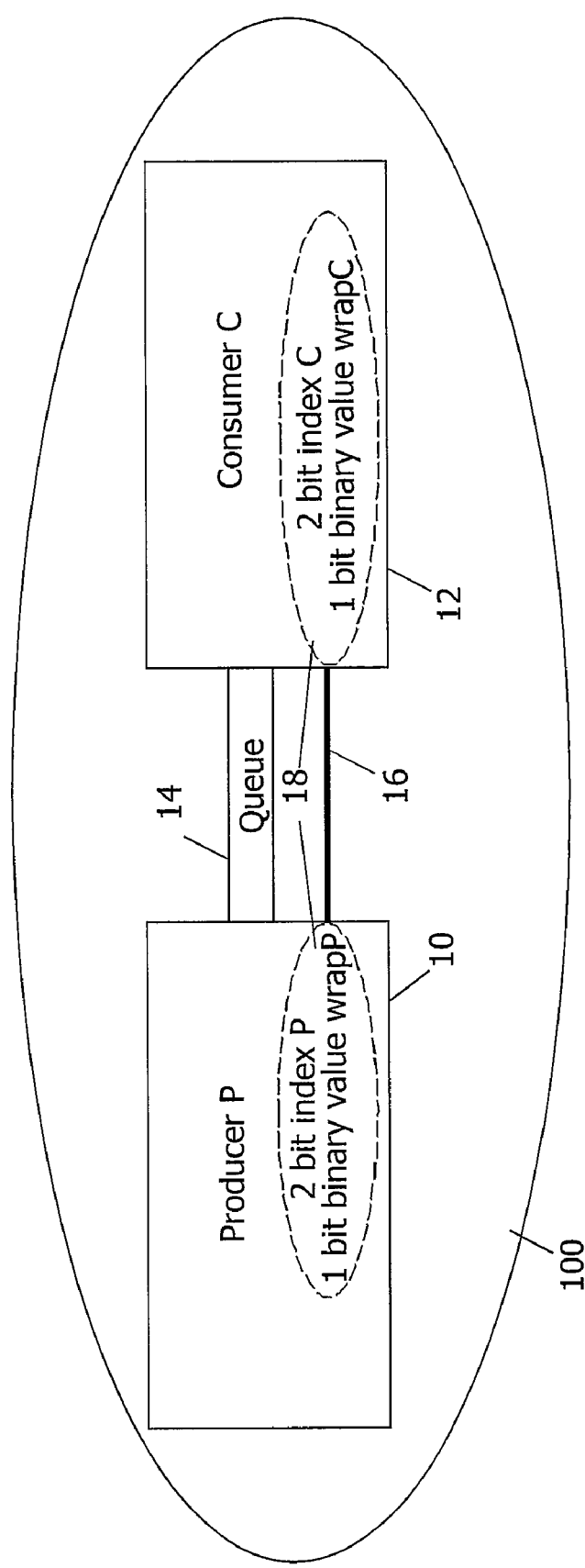
FIG. 1 shows a schematic view of the data pipeline management system according to the invention.

FIG. 1 shows the data pipeline management system 100 according to the invention comprising a Producer 10 and Consumer 12, connected to each other via a unidirectional queue 14 for data transfer with a handshake mechanism 16, wherein all entries in the queue are accessible by the Producer 10 and Consumer 12, only the last entry is valid, and read and write actions to the pipeline are asynchronous. The data pipeline management system according to the invention can be implemented as a queue 14 of as little as three entries 20 and an additional handshake mechanism 16, implemented as a set of indices 18 that can fit in a minimum of six bits (2×2+2×1).

Both the Producer 10 and Consumer 12 will have a 2 bit index indicating where they are in the queue, the corresponding indices being labeled P and C, and a 1 bit binary value indicating a special situation denoted by wrapP and wrapC. Both parties can read all the indices but can only write their own, i.e. P and wrapP for the Producer 10 and C and wrapC for the Consumer 12.

The queue 14 is for all effects seen as a circular queue 14 implying that entry 0 follows the last, i.e. if the queue size is the minimum of 3, then entry 0 follows entry 2. In the next algorithm if an index is 2 and it is increased by 1 the result will be 0, or if it increased by 2 the result will be 1.

The philosophy behind the management of the indices 18 is based on the fact that each entity must have exclusive access to the entry it needs. So by setting its index to any value, the Producer 10 marks it as its own and blocks the Consumer 12 from being able to read from that entry. The same is true for the Consumer 12 except that the entry is marked for reading and the Producer 10 is blocked from writing to it. If both indices have the same value the Producer 10 then takes precedence. This will only occur if the queue 14 becomes empty.

This in fact, implies that the Producer 10 has a 'Write First-Update Indices Later' mechanism, whereas the Consumer 12 has a 'Update Indices First-Read Later' mechanism. There is only one exception where the Consumer 12 needs to update its index also after reading.

The minimum memory solution according to the invention uses just three entries to the queue 14, one which can be used by the Consumer 12, one by the Producer 10 and one as a buffer. However, such minimum memory solution requires an elaborate handshake mechanism 16 in order to make sure that no data is lost in any case. The whole pipeline is memory mapped as opposed to most FIFO implying that without a handshake mechanism 16 all entries can be read by either part. By using a set of queue indices for each of the communication parties, accessible for read for both of them, but where each can only write its own set of indices, each party can determine the next entry to read/write. An effect of the invention is that the bus architecture determines that the two parties will not make concurrent accesses to the memory.

The rules for accessing the queue 14 are shown in Tab. 1 and 2. Tab. 1 describes the accesses of the Producer to the queue 14, where the Producer 10 is only allowed to change its set of indices, i.e. P and wrapP. In the case that C is equal to P+1, then a write P is performed to the queue entry associated with the value of P and the next indices values are set to P=P+2 and wrapP is set equal to not wrapC (!wrapC). In situation 2, if C is not equal to P+1, i.e. C !=P+1, where the symbol "!=" means "not equal", a write P is performed and P is afterwards set to P+1 and wrapP equal to wrapC.

TABLE 1

| Producer 10 (only allowed to change P and wrapP) | | | |
|---|---|---|---|
| Condition | Write | Next Indices Values | Situation |
| C=P+1 | Write P | P=P+2<br>wrapP = !wrapC | 1 |
| C!=P+1 | Write P | P=P+1<br>wrapP = wrapC | 2 |

Tab. 2 lists the rules for the Consumer 12 for accessing the queue. The Consumer 12 is also only allowed to change its set of indices, i.e. the two-bit index C and the binary value wrapC. In situation 3, line 1 of Tab. 2, C is exactly equal to P (C=P) and wrapP is exactly equal to wrapC (wrapP==wrap C), describing the situation where the queue 14 is empty and therefore no read is performed. However, if C is equal to P−1 and wrapP is equal to wrapC, then a read is performed. The read is generally performed after updating the indices. In this very special situation the indices are left unaltered before the read and a post-read update takes place. In the case that wrapC equals wrapP, C is set to C+1, otherwise C and wrapC remain unchanged. Since a read action may be non-atomic, there may have been a write action during the read action, making it necessary to change the indices afterwards. A read C is also performed if C equals P−1 and wrapP is not equal to wrapC (situation 5). The newest indices values updated before the read are C=C−1 and wrapC remains unaltered. In situation 6 when C is not equal to P−1 and wrapP and wrapC are equal, wrapC remains unchanged and C is set to P−1 and a read C occurs. If C is not equal P−1 and wrapP is also not equal to wrapC, then no read occurs and the newest data indices values are C=P and wrapC is equal to wrapP.

TABLE 2

Consumer (only allowed to change C and wrapC)

| Condition | Newest Data Indices Values | Read | Situation |
|---|---|---|---|
| C = = P and wrapP = = wrapC Empty | none | None | 3 |
| C = = P−1 and wrapP = = wrapC | C=C wrapC = wrapC | Read C * Post-read update: If wrapC==wrapP then C=C+1 else C=C wrapC=wrapC | 4 |
| C = = P−1 and wrapP != wrapC | C=C−1 wrapC = wrapC | Read C | 5 |
| C != P−1 and wrapP = = wrapC | C=P−1 wrapC = wrapC | Read C | 6 |
| C != P−1 and wrapP != wrapC | C=P wrapC = wrapP | None | 7 |

Figures 1, 2, 4:
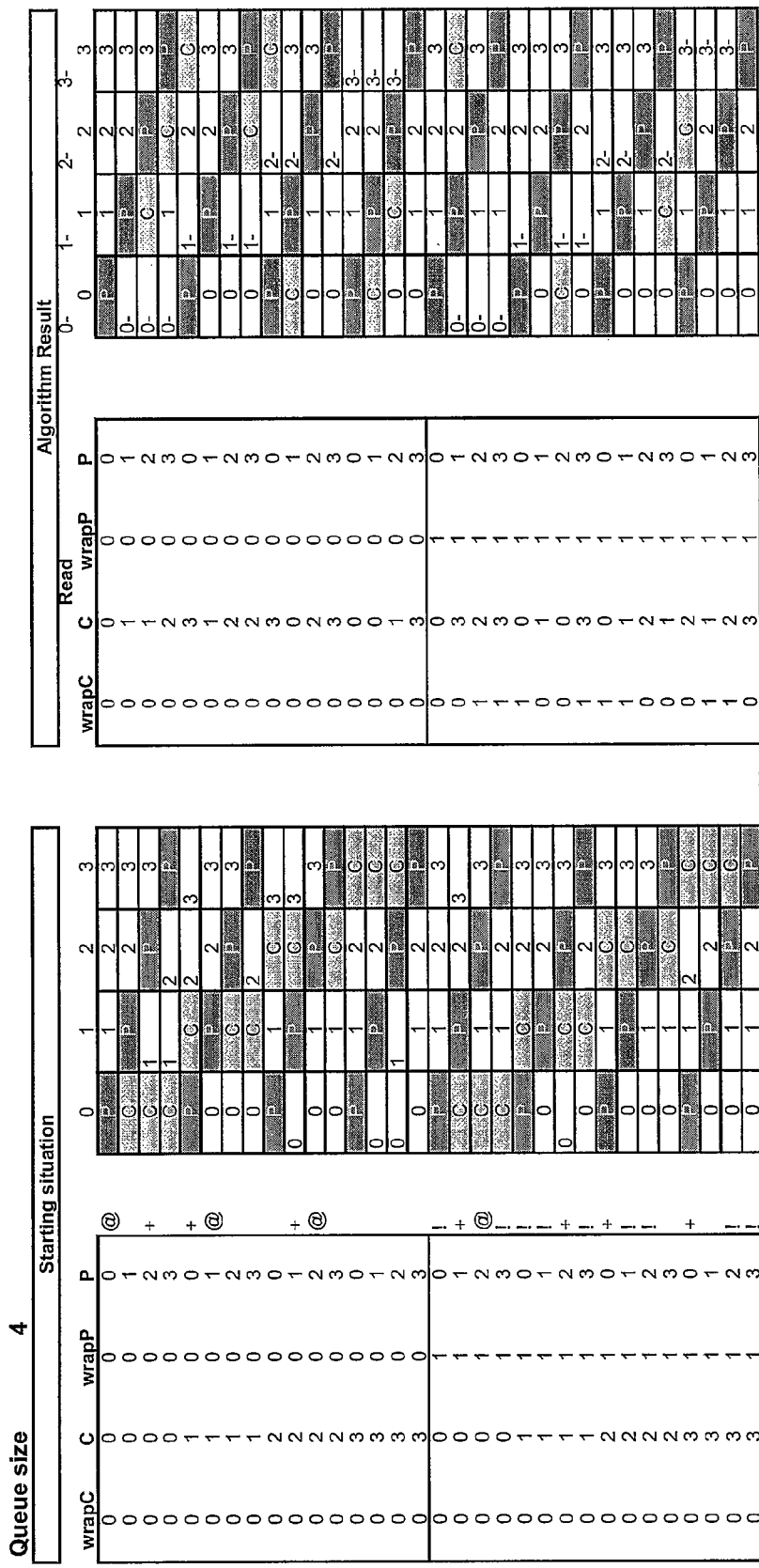
FIG. 2 shows the indices and the queue of the data pipeline management system according to the invention for the minimum queue size three, before and after a read, in a schematic view.
FIG. 4 shows the indices and the queue for the data pipeline management system according to the invention for a queue size of four and a read in a schematic view.
Figures 1, 2, 5:
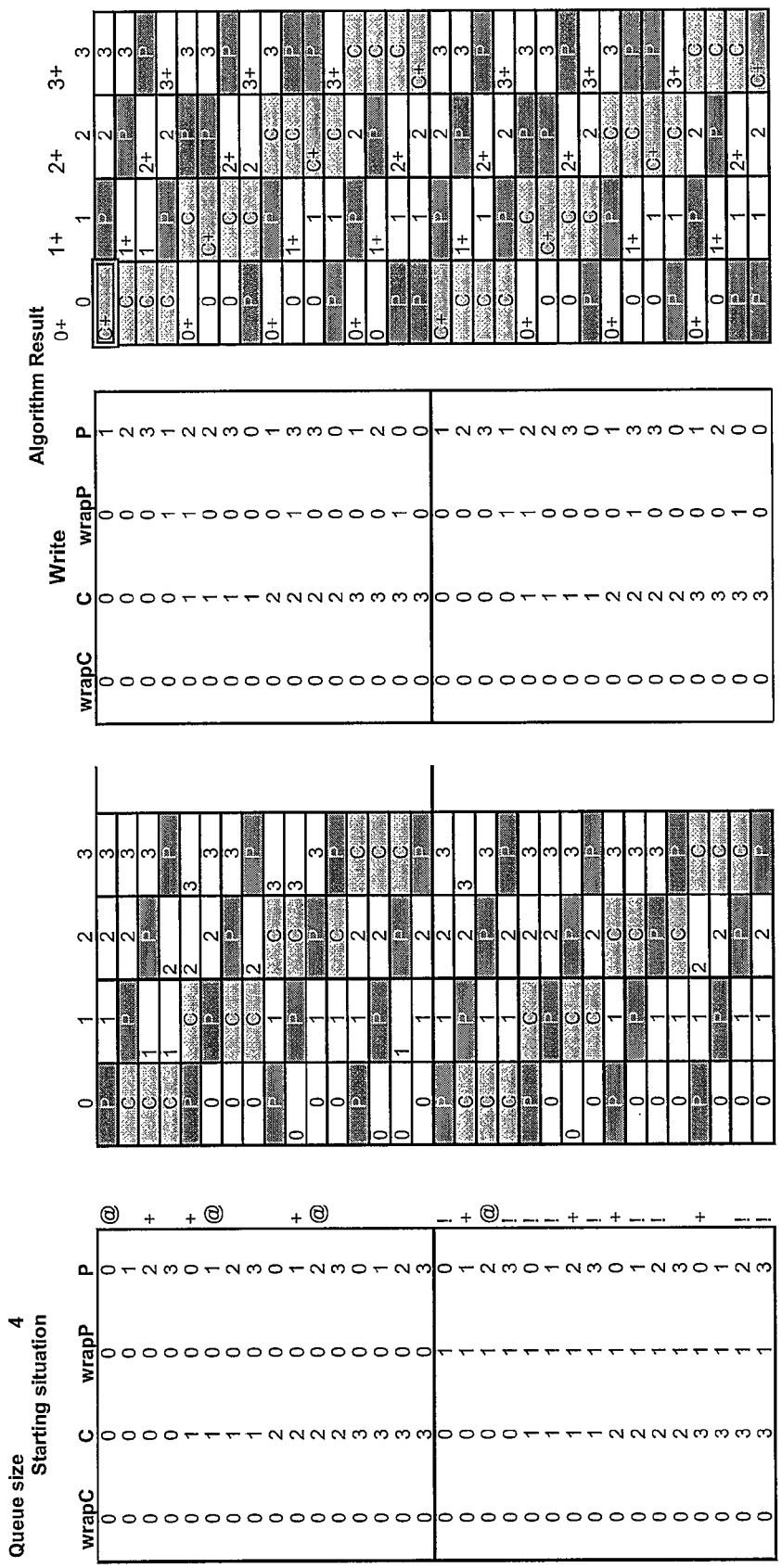
FIG. 5 shows the indices and the queue for the data pipeline management system according to the invention for a queue size of four and a write in a schematic view.
Figures 1, 5:
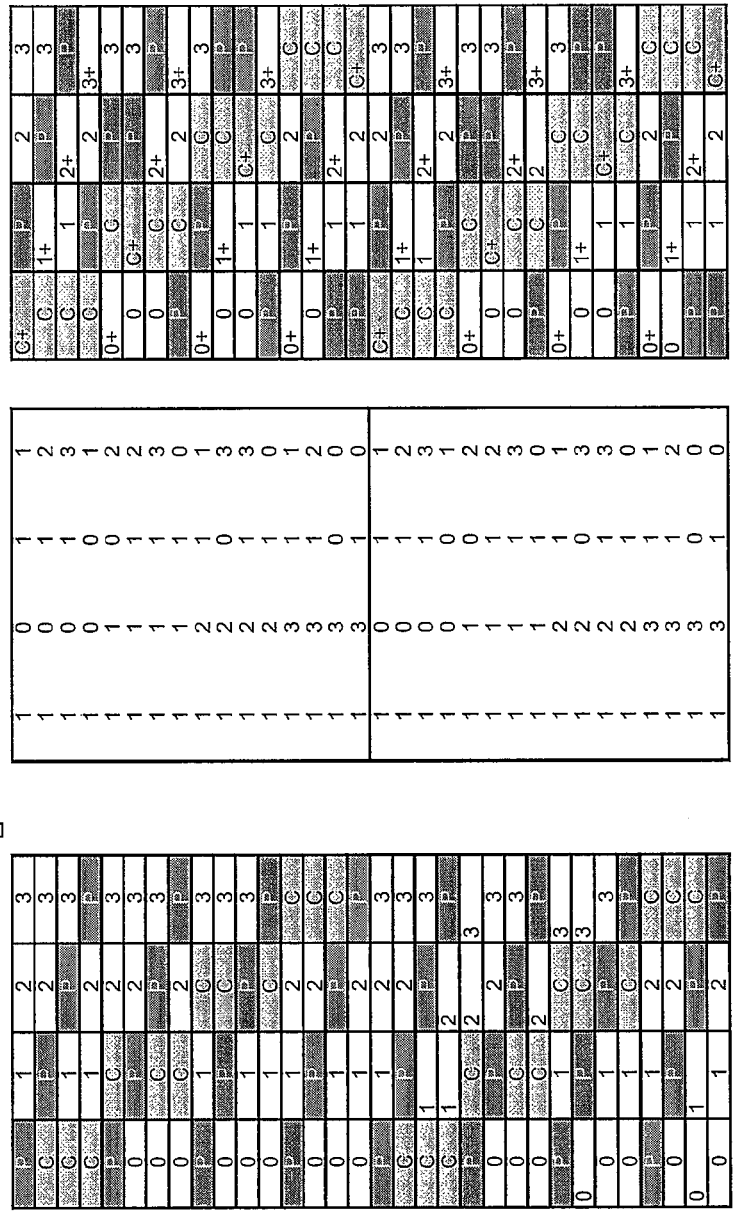
Figures 2, 5:
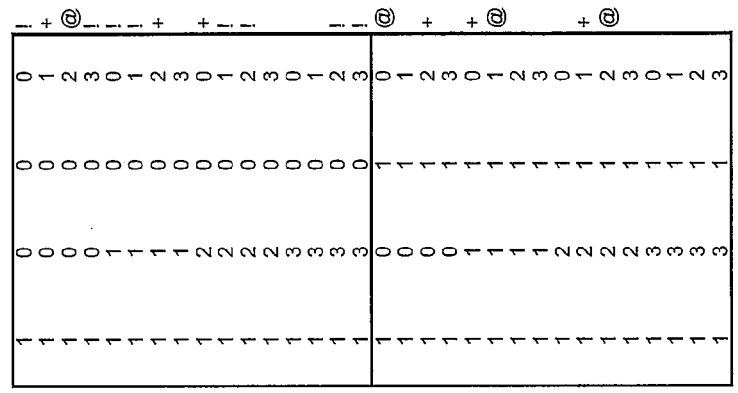

FIGS. 1 and 2 show the indices 18 and the queue entries 20 according to the invention for a queue 14 with the minimum length of 3 entries, i.e. 0, 1 and 2. This is the minimum memory solution for a unidirectional data pipeline management in a situation where both Producer 10 and Consumer 12 need asynchronous access to the pipeline 14, data can be non-atomic, only the last complete (and validated) received message is relevant and once a data read from/write to the pipeline is initiated, that data must be completely processed. Note that the queue 14 according to the invention is a circular queue.

FIG. 1 displays the result of the algorithm for a read to the queue 14 through the consumer 12. The starting position of the first line is that all indices, i.e. wrapP, wrapC, C and P are equal to zero. This corresponds to situation 1 of Table 2. No read occurs, no update is performed and element 0 of the queue is marked as belonging to the Producer P 10, which takes precedence in this situation, the queue 14 is empty.

The second line corresponds to situation 4 of Table 2, where wrapC, C and wrapP are zero and P is one, i.e. C=P−1 and wrapP is equal to wrapC. In the starting position, entry 0 of the queue is marked as the entry of the Consumer 12, since C is equal to 0, and entry 1 is marked as the entry of the Producer 10, since P is equal to 1. A read C occurs emptying and changing element 0 of the queue 14. A post-read update occurs and since wrapC is equal to wrapP, C is set to C+1. Now entry 1 of the queue 14 is marked by the Consumer 12.

The third line corresponds to situation 6 of Table 2. WrapC, C and wrapP are all zero but P is two, i.e. C is not equal P−1 and wrapC is equal to wrapP. Therefore we start in a configuration where queue entry 0 is associated with the Consumer 12 and 2 with the Producer 10. The newest indices values are C=P−1, i.e. 1, and wrapC is left unaltered. Element 0 of the queue is now emptied and changed through the read, element 1 is associated with the Consumer 12.

Line 7 of FIG. 1 relates to a situation where the circularity of the queue 14 is effective. Now, wrapC and wrapP are both 0, as well as P, but C is 2, i.e. element 0 of the queue 14 is marked by the Producer 10, element 2 by the Consumer 12. This corresponds to situation 4 of Tab. 2. Since the queue is circular, C is equal to P−1, which is actually −1 or in a circular queue 2. A read C is performed and C is set to C+1, i.e. 2+1, which is in a circular queue with three entries 0.

Situations which can never occur after a write or a read, respectively, are pointed out in Tab. 1 and 2, along with situations which cannot occur at all.

FIG. 2 describes the same processes for a write to the queue 14. The first line corresponds to situation 2 of Tab. 2. C is zero and P is zero. P takes precedence in this case. C is not equal to P+1, a write P to entry 0 occurs and element 1 is now marked for the Producer 10, while element 0, where the information has been written to, is labeled for reading by the Consumer 12 and therefore blocked for writing by the Producer 10. Accordingly, the next index values are P=1 and wrapP=wrapC.

Figure 3:
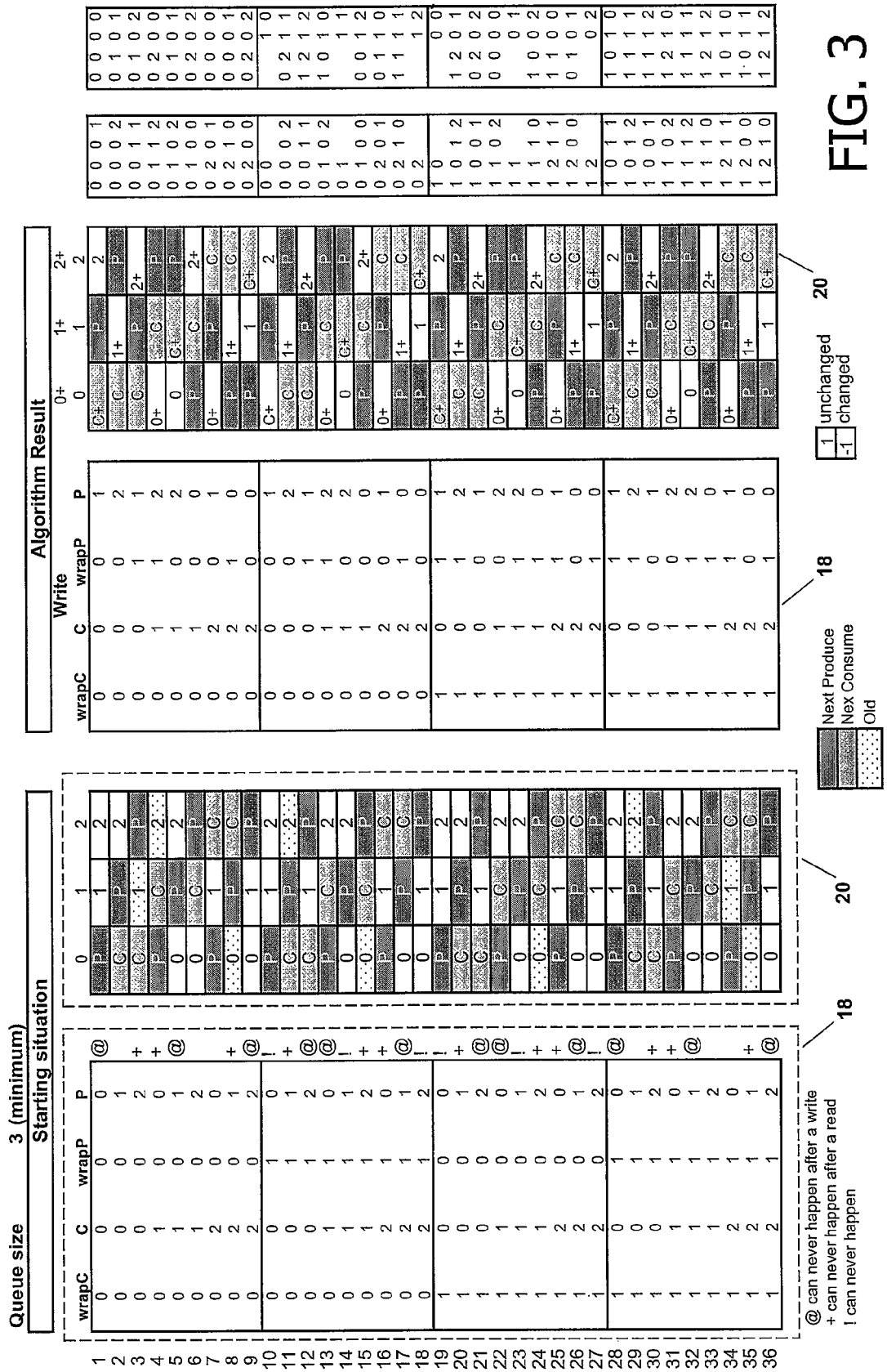
FIG. 3 shows the indices and the queue for the data pipeline management system according to the invention for a the minimum queue size three, before and after a write, in a schematic view.

FIGS. 3 and 4 describe the same situation with a queue 14 of more than three entries, here four. For instance, line 1 in FIG. 3 corresponds to the configuration in line 1 of FIG. 1, i.e. the situation 1 described in Tab. 2.

The algorithm according to the invention is not bound to any specific protocol. It can be used for a generic application that requires a data transfer where the following conditions are verified: a one direction pipeline 14, all entries 20 in the pipeline 14 are accessible by the Producer 10 and Consumer 12, only last entry is valid, and read and write actions are asynchronous. The communicated data could comprise a command, a parameter or any related information of the system.

The data pipeline management system 100 can be used for any host computer system having a subsystem. The host computer is the Producer 10, the subsystem the Consumer 12, vice versa. It can also be used in an application comprising a host and a number of subsystems linked to the host via the data pipeline management system 100 according to the invention.

The data pipeline management system 100 according to the invention is preferably used in communication systems for automobiles. For instance, Flex Ray is a serial and error-tolerant high-speed bus for automobiles. In one preferred embodiment the invention is used for the communication between the microcontroller, e.g. ARM9, and the FlexRay Data Link Controller DLC. In this embodiment the microcontroller is the Producer 10, and the DLC is the 12, vice versa. However, any other data link controller, such as the Local Interconnect Network (LIN) controller or a Controller Area Network (CAN) controller can also be applied.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit of the invention as defined in the following claims.

LIST OF REFERENCE SIGNS

100 Data pipeline management system
10 Producer
12 Consumer

14 Pipeline/Queue
16 Handshake mechanism
18 Set of indices
20 Queue entries

The invention claimed is:

1. Data pipeline management system comprising a Producer and a Consumer, and a unidirectional pipeline for data transfer, wherein all entries in the pipeline are accessible by the Producer and the Consumer, and read and write actions to the pipeline are asynchronous, characterized in that said pipeline is implemented as a circular queue of at least three entries, and a handshake mechanism is provided as a set of indices fitting into a minimum of six bits, characterized in that said set of indices comprises 2-bit indices for both the Producer and the Consumer, respectively, indicating their position in said queue, and 1-bit binary values for both the Producer and the Consumer, respectively, indicating a special situation.

2. The system according to claim 1, characterized in that said queue is shared-memory.

3. The system according to claim 1, characterized in that said data is non-atomic.

4. The system according to claim 1, characterized in that the pipeline is implemented as a circular queue of three entries.

5. The system according to claim 1, characterized in that the pipeline is implemented as a circular queue of four entries.

6. The system according to claim 1, characterized in that the handshake mechanism is provided as a set of indices fitting into six bits.

7. The system according to claim 1, characterized in that said Producer is a microcontroller and said Consumer is a subsystem or said Producer is a subsystem and said Consumer is a microcontroller.

8. The system according to claim 1, characterized in that said Producer is a microcontroller and said Consumer is a Flexray Data Link Controller or said Producer is a Flexray Data Link Controller and said Consumer is a microcontroller.

9. The system according to claim 1, characterized in that said Producer is a microcontroller and said Consumer is a Local Interconnect Network Controller or said Producer is a Local Interconnect Network Controller and said Consumer is a microcontroller.

10. The system according to claim 1, characterized in that said Producer is a microcontroller and said Consumer is a Controller Area Network Controller or said Producer is a Controller Area Network Controller and said Consumer is a microcontroller.

11. Method for using a data pipeline management system, comprising a Producer and a Consumer, and a unidirectional pipeline for data transfer, wherein all entries in the pipeline are accessible by the Producer and the Consumer, and read and write actions to the pipeline are asynchronous, characterized in that the method comprises the steps of:
  providing a circular queue of at least three entries;
  providing a handshake mechanism as a set of indices fitting into a minimum of six bits comprising associating a 2-bit index with said Producer and with said Consumer, respectively, indicating the respective position in the queue, and associating a 1-bit binary value with said Producer and with said Consumer, respectively, indicating a special situation;
  marking a queue entry as belonging to the Producer by setting its 2-bit index to the corresponding value and blocking the Consumer from being able to read from that entry;
  marking a queue entry as belonging to the Consumer by setting its 2-bit index to the corresponding value and blocking the Producer from being able to write to that entry; and
  accessing the queue, wherein the Producer uses a write first-update later mechanism and the Consumer uses a update indices first-read later mechanism.

12. The Method according to claim 11, characterized in that said Producer is only allowed to change its set of indices, a 2-bit index P and a 1-bit binary value wrapP, and its accessing the queue follows the steps:
  if the Consumers 2-bit index C is equal to the Producers 2-bit index P+1, i.e. C=P+1, the Producer writes to the queue entry associated with its 2-bit index P, and its 2-bit index P is set to P+2, its one bit binary value wrapP is set to the negation of the 1-bit binary value of the Consumer (12) wrapC, i.e, wrapP=!wrapC;
  if C!=P+1, write P, and set the next index values to P=P+1, wrapP=wrapC.

13. The Method according to claim 11, characterized in that said Consumer is only allowed to change its set of indices, the 2-bit index C and the 1-bit binary value wrapC, and its accessing the queue follows the steps:
  if C==P and wrapP==wrapC no update and no read is performed;
  if C==P−1 and wrapP==wrapC then setting the newest data indices values to C=C, wrapC=wrapC and performing a read C followed by a post read-update comprising if wrapC==wrapP then setting the newest data indices values to C=C+1 else C=C, wrapC=wrapC;
  if C!=P−1 and wrapP==wrapC then setting the newest data indices values to C=P−1, wrapC=wrapC and performing a read C; and
  if C!=P−1 and wrapP!=wrapC then setting the newest data indices values to C=P, wrapC=wrapP and performing no read.

14. The Method according to claim 11, characterized by updating the Consumer index also after reading.

15. The Method according to claim 11, characterized by taking precedence of the Producer if the queue becomes empty, i.e, if C==P and wrapP==wrapC.

16. A computer readable medium having instructions when executed by a computer device causes the computer device to perform the steps of:
  providing a circular queue of at least three entries;
  providing a handshake mechanism as a set of indices fitting into a minimum of six bits comprising associating a 2-bit index with a Producer and with a Consumer, respectively, indicating the respective position in the queue, and associating a 1-bit binary value with said Producer and with said Consumer, respectively, indicating a special situation;
  marking a queue entry as belonging to the Producer by setting its 2-bit index to the corresponding value and blocking the Consumer from being able to read from that entry;
  marking a queue entry as belonging to the Consumer by setting its 2-bit index to the corresponding value and blocking the Producer from being able to write to that entry; and
  accessing the queue, wherein the Producer uses a write first-update later mechanism and the Consumer uses a update indices first-read later mechanism.

* * * * *